(12) United States Patent
Phillips et al.

(10) Patent No.: US 6,998,103 B1
(45) Date of Patent: Feb. 14, 2006

(54) METHOD FOR PRODUCING CARBON NANOTUBES

(75) Inventors: Jonathan Phillips, Santa Fe, NM (US); William L. Perry, Jemez Springs, NM (US); Chun-Ku Chen, Albuquerque, NM (US)

(73) Assignee: The Regents of the University of California, Los Alamos, NM (US)

( * ) Notice: Subject to any disclaimer, the term of this patent is extended or adjusted under 35 U.S.C. 154(b) by 553 days.

(21) Appl. No.: 10/295,129

(22) Filed: Nov. 15, 2002

(51) Int. Cl.
*D01F 9/12* (2006.01)

(52) U.S. Cl. ............................. 423/447.3; 977/DIG. 1

(58) Field of Classification Search ............. 423/447.3
See application file for complete search history.

(56) References Cited

U.S. PATENT DOCUMENTS

| | | | |
|---|---|---|---|
| 4,663,230 A | 5/1987 | Tennent ...................... | 428/367 |
| 5,707,916 A | 1/1998 | Snyder et al. .............. | 502/180 |
| 5,989,648 A | 11/1999 | Phillips ...................... | 427/456 |
| 6,221,330 B1 | 4/2001 | Moy et al. .................. | 423/447 |
| 6,261,484 B1 | 7/2001 | Phillips et al. ................. | 264/5 |
| 6,306,564 B1 | 10/2001 | Mullee ...................... | 430/329 |
| 6,333,016 B1 | 12/2001 | Resasco et al. .......... | 423/447.3 |
| 6,346,189 B1 | 2/2002 | Dai et al. .................... | 205/766 |
| 6,385,291 B1 | 5/2002 | Takami ........................ | 378/84 |
| 6,400,088 B1 | 6/2002 | Livingston et al. ........... | 315/94 |
| 6,413,487 B1 | 7/2002 | Resasco et al. .......... | 423/447.3 |
| 6,417,265 B1 | 7/2002 | Foulger ....................... | 524/495 |
| 6,419,717 B1 | 7/2002 | Moy et al. .................... | 44/457 |
| 6,422,450 B1 | 7/2002 | Zhou et al. ............ | 228/121.85 |
| 6,426,590 B1 | 7/2002 | Chung et al. ............... | 313/496 |
| 6,428,134 B1 | 8/2002 | Clark et al. ................. | 347/10 |
| 6,437,329 B1 | 8/2002 | Yedur et al. ................ | 250/306 |
| 6,440,761 B1 | 8/2002 | Choi ............................ | 438/20 |
| 6,445,006 B1 | 9/2002 | Brandes et al. ............. | 257/76 |

OTHER PUBLICATIONS

Qin, L. C., et al., "Growing Carbon Nanotubes by Microwave Plasma-Enhanced Chemical Vapor Deposition" Jun. 29, 1998, Applied Physics Letters, vol. 72, No. 26, pp. 3437-3439.*
Nikolaev, P., et al., "Gas-Phase Catalytic Growth of Single-Walled Carbon Nanotubes from Carbon Monoxide" Nov. 5, 1999, Chemical Physics Letters, vol. 313, pp. 91-97.*
S. Iijima, "Helical Microtubules of Graphitic Carbon," Nature, vol. 354, pp. 56-58 (1991).
S. Iijima, "Single-shell Carbon Nanotubes of 1-nm Diameter," Nature, vol. 363, pp. 603-607, (1993).
A. Thess et al., "Crystalline Ropes of Metallic Carbon Nanotubes," Science.

(Continued)

*Primary Examiner*—Stuart L. Hendrickson
*Assistant Examiner*—Rebecca M. Stadler
(74) *Attorney, Agent, or Firm*—Samuel L. Borkowsky (57) ABSTRACT

Method for producing carbon nanotubes. Carbon nanotubes were prepared using a low power, atmospheric pressure, microwave-generated plasma torch system. After generating carbon monoxide microwave plasma, a flow of carbon monoxide was directed first through a bed of metal particles/glass beads and then along the outer surface of a ceramic tube located in the plasma. As a flow of argon was introduced into the plasma through the ceramic tube, ropes of entangled carbon nanotubes, attached to the surface of the tube, were produced. Of these, longer ropes formed on the surface portion of the tube located in the center of the plasma. Transmission electron micrographs of individual nanotubes revealed that many were single-walled.

13 Claims, 7 Drawing Sheets

OTHER PUBLICATIONS

C. Journet et al., "Production of Carbon Nanotubes," Appl. Phy. A., vol. 67, pp. 1-9, (1998).

E. G. Rakov, "Method for Preparation of Carbon Nanotubes," Russ. Chem. Rev., vol. 69, No. 1, pp. 35-52, (2000).

M. Okai et al., "Structure of Carbon Nanotubes Grown by Microwave-Plasma-Enhanced Chemical Vapor Deposition," Appl. Phys. Lett., vol. 77, No. 21, pp. 3468, (2000).

H. M. Cheng et al., "Large-Scale and Low-Cost Synthesis of Single-Walled Carbon Nanotubes by the Catalytic Pryolysis of Hydrocarbons," Appl. Phys., vol. 72, No. 25, pp. 3282-3284, (1998).

H. M. Cheng et al., "Bulk Morphology and Diameter Distribution of Single-Walled Carbon Nanotubes Synthesized by Catalytic Decomposition of Hydrocarbons," Chem. Phys. Lett., 289, pp. 602-610, (1998).

H. Dai et al., "Single-Wall Nanotubes Produced by Metal-Catalyzed Disproportionation of Carbon Monoxide," Chem. Phys. Lett., 260, pp. 471-475, (1996).

H. Shim et al., "Restructuring of Alumina Particles Using a Plasma Torch," J. Mater. Res., vol. 14, No. 3, pp. 849-854, (1999).

C. K. Chen et al., "Low-Power Plasma Torch Method for the Production of Crystalline Spherical Ceramic Particles," J. Mater. Res., vol. 165, No. 5, pp. 1256-1265, (2001).

P. M. Ajayan, "Carbon Nanotubes," Handbook of Nanostructured Materials and Nanotechnology, vol. 5, pp. 375-406, (2000).

J. Sloan et al., "Encapsulation and Crystallization Behavior of Materials Inside Carbon Nanotubes," Handbook of Nanostructured Materials and Nanotechnology, vol. 5, pp. 407-432, (2000).

X. Wang et al., "Synthesis of Multi-Walled Carbon Nanotubes by Microwave Plasma-Enhanced Chemical Vapor Deposition," Thin Solid Films 390, pp. 130-133, (2001).

Y. Ando et al., "Arc Plasma Jet Method Producing Single-Wall Carbon Nanotubes," Diamond and Related Materials 10, pp. 1185-1189, (2001).

P. Nikolaev et al., "Gas-Phase Catalytic Growth of Single-Walled Carbon Nanotubes from Carbon Monoxide," Chem. Phys. Lett. 313, pp. 91-97, (1999).

B. Kitiyanan et al., Controlled Production of Single-Wall Carbon Nanotubes by Catalytic Decomposition of CO on Bimetallic Ci-Mo Catalysts., Chem. Phys. Lett. 317, pp. 497-503, (2000).

* cited by examiner

METHOD FOR PRODUCING CARBON NANOTUBES

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to nanotubes and more particularly to a method for preparing carbon nanotubes.

BACKGROUND OF THE INVENTION

Carbon nanotubes are seamless nanometer scale tubes of graphite sheets with fullerene caps. They have shown promise for nanoscale electronic devices, chemical sensors, high strength materials, field emission arrays, tips for scanning probe microscopy, gas storage, and other important applications.

Carbon nanotubes may be multi-walled or single walled. Carbon multi-walled nanotubes (MWNTs) were discovered in the hard deposit formed on the graphite cathode of an arc-evaporation apparatus used to prepare carbon fullerenes $C_{60}$ and $C_{70}$ (S. Iijima, "Helical Microtubules of Graphitic Carbon," Nature, vol. 354, pp. 56–58 (1991)). Carbon single wall nanotubes (SWNTs) were reported shortly thereafter (Iijima et al., Nature, vol. 363, p. 603, 1993; and Bethune et al., Nature, vol. 363, p. 605, 1993). In the years following their initial discoveries, many other reports relating to carbon nanotubes have appeared. Some of these include the following: Thess, A. et al., Science 273, 483 (1996); Ivanov, V. et al., Chem. Phys. Lett 223, 329 (1994); Li A. et al., Science 274, 1701 (1996); C. Journet et al. Appl. Phys. A, vol. 67, pp. 1–9 (1998); E. G. Rakov, Russ. Chem. Rev., vol. 69, no. 1, pp. 35–52 (2000); X. Wang et al., Thin Solid Films, vol. 390, pp. 130–133 (2001); and M. Okai, T. Muneyoshi, T. Yaguchi and S. Sasaki, Appl. Phys. Lett, vol 77, pp. 3468 (2000)). Some of these reports demonstrate the production of SWNTs using arc and laser techniques. Carbon vapor deposition using transition metal catalysts tends to produce MWNTs as a main product instead of SWNT. Catalysts containing iron, cobalt, or nickel, for example, have been used at temperatures of about 850° C. to 1200° C. to form MWNT (see U.S. Pat. No. 4,663,230).

There has been some success in producing carbon SWNTs from the catalytic cracking of hydrocarbons. Rope-like bundles of SWNTs were generated from the thermal cracking of benzene with an iron catalyst and sulfur additive at temperatures between 1100–1200° C. (Cheng, H. M. et al., Appl. Phys. Lett. 72, 3282 (1998); Cheng, H. M. et al., Chem. Phys. Left. 289, 602 (1998)). These SWNTs are roughly aligned in bundles and woven together, similar to those obtained from laser vaporization or electric arc method. The use of iron and at least one element chosen from Group V (V, Nb and Ta), VI (Cr, Mo and W), VII (Mn, Tc and Re) or the lanthanides has also been proposed (U.S. Pat. No. 5,707,916).

SWNTs have also been produced from the disproportionation of carbon monoxide (CO) with a molybdenum catalyst supported on alumina heated to 1200° C. (see Dai, H. et al., Chem. Phys. Lett. 260, 471 (1996)). From the reported electron microscope images, molybdenum metal appears to attach to nanotubes at their tips. The reported diameter of SWNT generally varies from 1 nm to 5 nm and seems to be controlled by the Mo particle size.

Generally, carbon SWNTs are preferred over MWNTs because SWNTs have fewer defects and are stronger and more conductive than MWNTs of similar diameter. There remains a need for methods of producing carbon nanotubes, and in particular, single-walled nanotubes.

Therefore, an object of the present invention is to provide a method for producing carbon nanotubes.

Another object of the present invention is to provide a method for producing carbon single-walled nanotubes (SWNTs).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for producing carbon nanotubes. According to the method, a flow of carbon monoxide gas is directed through metal particles and then across a solid surface located in a microwave plasma. As the gas flow interacts with the microwave plasma, carbon nanotubes form on the solid surface.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

The invention includes a plasma-based method for producing carbon single walled nanotubes (SWNTs) and carbon multi-walled nanotubes (MWNTs) in high yield. According to the method, a flow of carbon monoxide gas is directed first through metal particles and then across a solid surface located in a microwave plasma. As the gas flow interacts with the plasma, carbon nanotubes form on the solid surface.

While not intending to be bound by any particular mechanistic description, it is believed that at least one volatile metal complex is formed as the carbon monoxide flows though the metal particles. The metal complex is carried by the carbon monoxide flow to the plasma where at least a portion of it is converted to carbon atoms and metal atoms. The carbon atoms can move through the metal particles, deposit, and become part of a growing nanotube. Alternatively, metal particles can "grab" onto carbon-containing species from the gas and "knit" the carbon atoms into a nanotube. Regardless of the mechanism, carbon nanotubes form on a solid surface in a microwave-generated plasma from carbon monoxide (CO) gas that has first passed through a bed or metal particles.

A plasma torch apparatus was used to generate the microwave plasma. This apparatus is similar to others that have been previously described and used for producing ceramic particles (see, for example, H. Shim et al., "Restructuring of Alumina particles Using a Plasma Torch", J. Mat. Res., volume 14, page 849 (1999); C-K Chen et al. J. Mat. Res., vol. 16, p. 1256, (2001); U.S. Pat. No. 5,989,648 to J. Phillips entitled "Plasma Generation of Supported Metal Catalysts," issued on Nov. 23, 1999; H. Shim, J. Phillips, and I. S. Silva, "Restructuring of Alumina Particles Using a Plasma Torch," J. Mat. Res., vol. 14, no. 3, pp. 849–854 (1999); C. K. Chen, S. Gleiman, and J. Phillips, "Low-Power Plasma Torch Method for the Production of Crystalline Spherical Ceramic Particles," J. Mat. Res., vol. 16, no. 5, pp. 1256–1265 (2001); and U.S. Pat. No. 6,261,484, to Phillips et al. entitled "Method for Producing Ceramic Particles and Agglomerates," all incorporated by reference herein).

Briefly, the apparatus used to produce carbon nantubes according to the invention includes a plasma torch that couples microwave energy from a microwave field to a flowing plasma gas stream to generate a stationary plasma with extreme axial temperature gradients. The plasma torch includes an Astex magnetron (Woburn, Mass.) that generates 2.54 GHz microwaves and a coupler that surrounds the field region where the plasma is generated. The field region is about 5-cm in height for this apparatus, which also includes a standard WR-289 -waveguide in the TE10 mode that transmits the microwaves (<1.5 kW) from the magnetron to the field region.

The apparatus includes an outer quartz outer tube (17-mm inner diameter (ID)) and an inner, coaxial ceramic tube (3-mm ID). While it is likely that a CO plasma could be formed by igniting CO directly in the torch, in practice it is much easier to begin with an argon plasma and then form the CO plasma from the argon plasma. Thus, an argon plasma was formed first by delivering a flow of argon to the torch through the volume between the outer tube and the inner tube. After igniting the argon and forming an argon plasma, a stream of carbon monoxide was introduced to the plasma, and then the argon flow was discontinued. Next, another flow of carbon monoxide was passed through a bed of iron particles/glass beads and then introduced to the torch through the volume between the outer quartz tube and the inner ceramic tube. As this carbon monoxide stream passed through the torch, carbon nanotubes formed on a portion of the outer surface of the inner ceramic tube residing in the plasma. The flow rates of the two CO streams were controlled separately.

The inner ceramic tube was used for delivering a stream of argon, as needed, to the plasma. Although the argon was introduced upstream of where the nanotubes formed, it is believed that nanotubes were formed faster when this argon stream was delivered through the ceramic tube to the plasma. It is believed that any noble gas (Ar, He, Kr, Xe, Ne), mixture of any of the noble gases, or any other gas capable of forming a stable plasma ($N_2$, $O_2$, and the like) would produce the same accelerating effect as the argon stream.

The gases combine as they enter the torch. After exiting the torch, the combined gases flow through a quartz chimney, then through a particle filter, and are finally vented through an exhaust. The gas pressure of the apparatus was regulated with a pressure controller and a mechanical vacuum pump.

Figure 1:
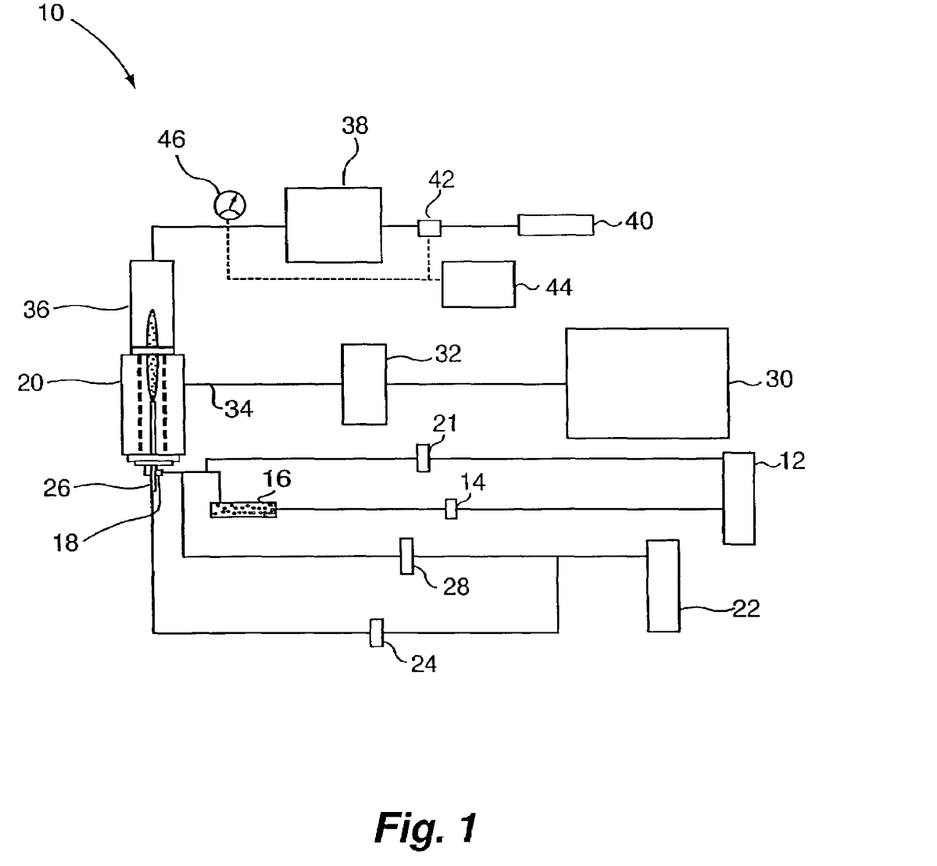
FIG. 1 shows a schematic, cross-sectional representation of the apparatus used to produce carbon nanotubes according to the invention.
Figure 2:
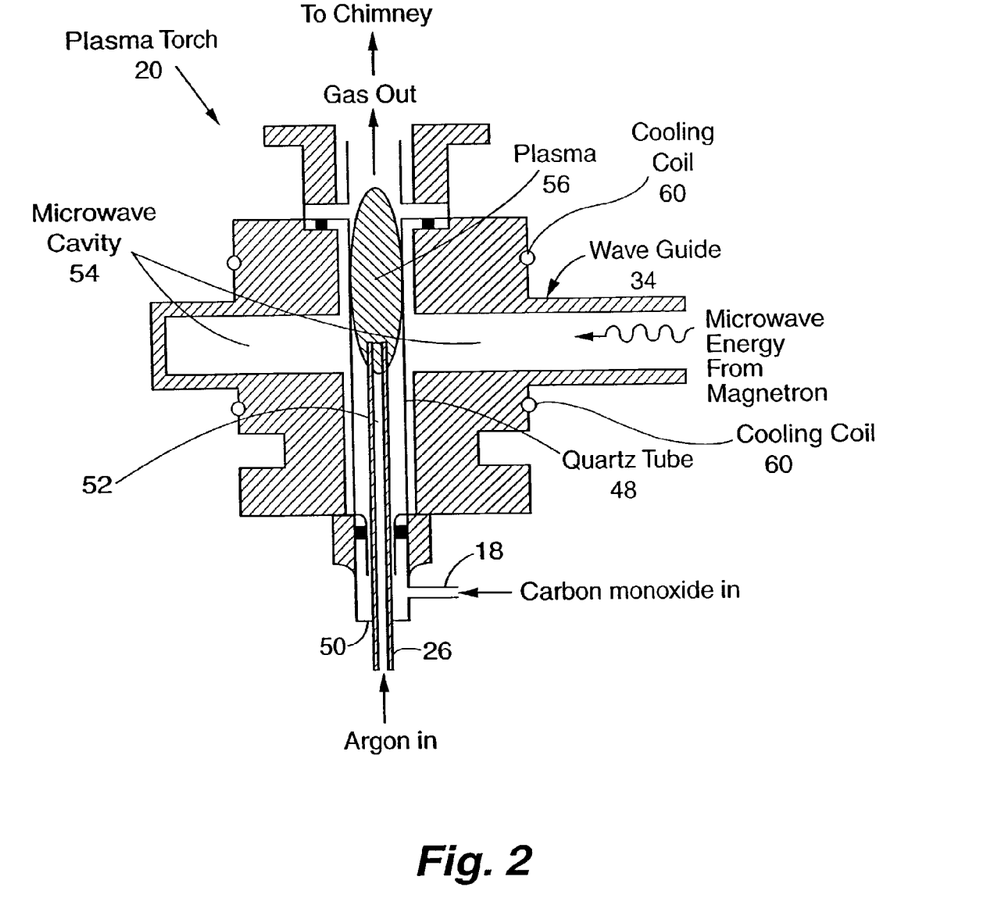
FIG. 2 shows a schematic, cross-sectional representation of a microwave plasma torch.

Reference will now be made in detail to the present preferred embodiments of the invention, examples of which are illustrated in the accompanying drawings. Similar or identical structure is identified using identical callouts. FIG. 1 shows a schematic representation of the apparatus used with the invention. FIG. 2 shows a detailed side view of the plasma torch of the apparatus of FIG. 1. Turning now to the Figures, FIG. 1 shows apparatus 10. Apparatus 10 includes pressurized carbon monoxide (CO) supply tank 12. Carbon monoxide from tank 12 flows through flow meter 14, then through metal particle bed 16, and then through gas inlet 18 and into plasma torch 20. A separate stream of carbon monoxide from supply tank 12 flows through flow meter 21 and then through gas inlet 18 and into plasma torch 20. Argon from pressurized argon tank 22 flows though flow meter 24 and into ceramic injector tube 26 of plasma torch 20. The argon gas flow line is configured such that argon from tank 22 may also be directed to flow through flow meter 28 and through gas inlet 18 and in practice this argon flow is used only to form the initial plasma.

Apparatus 10 includes magnetron 30 and a 3-stub tuner 32 for tuning microwave radiation directed at torch 20 via waveguide 34.

Gas and suspended particles exit torch 20 and flow through chimney 36 and then through filter 38.

Apparatus 10 includes mechanical pump 40, which evacuates the portion of the apparatus downstream of filter 38. Valve 42 and pressure controller 44 monitor and regulate the vacuum of pump 40. In the volume downstream of chimney 36 and upstream of filter 38, the system pressure is monitored with pressure gauge 46.

A schematic cross-sectional representation of plasma torch 20 is shown in FIG. 2. Ceramic injector tube 26 passes through coaxial outer quartz tube 48 of torch 20. Ceramic tube 26 seals against lower end 50 of quartz tube 48. The CO containing gas stream enters lower end 50 of quartz tube 48 through gas inlet 18. Upper end 52 of ceramic injector tube 26 extends into microwave cavity 54. Microwave energy generated by magnetron 30 (see FIG. 1) is directed through waveguide 34 and into microwave cavity 54. The microwave energy interacts with electrons inside cavity 54 to create plasma 56. Cooling coils 60 surround torch 20 are provided with flowing cooling water to remove excess heat from the torch.

Carbon nanotubes are formed on the portion of the outer surface of ceramic injector tube 26 that resides in microwave cavity 54 (i.e. the coupler region). None were observed in filter 38, a particle trap type filter with filter paper, or anywhere else downstream of filter 38.

In practice, the argon stream through inner ceramic injector tube 26 was required for nanotube production. In the absence of this stream, no nanotubes were observed. Surprisingly, when an argon stream was though the volume between inner ceramic injector tube 26 and outer quartz tube 48 was used instead of the argon stream through inner ceramic injector tube 26, no nanotubes were observed.

Table I summarizes the microwave power, argon flow rate through ceramic injector tube 26, combined carbon monoxide plasma gas through inlet 18, and flow rate of carbon monoxide through the bed of metal particles for eight runs. Carbon nanotubes were produced in every run.

TABLE 1

| Conditions | 1 | 2 | 3 | 4 | 5 | 6 | 7 | 8 |
|---|---|---|---|---|---|---|---|---|
| Power (W) | 400 | 400 | 400 | 420 | 410 | 400 | 600 | 400/400 |
| Ar flow rate through ceramic injector tube 26 (sccm) | 550 | 550 | 550 | 550 | 550 | 550 | 860 | 550/550 |
| CO plasma gas flow rate through inlet 18 (sccm) | 1753 | 1753 | 1550 | 1340 | 1120 | 1120 | 890 | 1750/1750 |
| CO flow rate through bed of iron particles/glass beads (sccm) | 22.4 | 10.6 | 16.9 | 16.9 | 10.6 | 22.4 | 11.4 | 22.5/10.5 |

Runs 1–7 were each performed in a single stage of about 120 minutes.

Run 8 was performed in two 120 minute stages. During the first 120 minute stage, the flow rate of flow rate of carbon monoxide through the particle bed was 22.5 sccm, during which iron and carbon deposited on the ceramic injector. The flow rate was decreased to 10.5 sccm for the second 120-minute stage with the belief that this adjustment would reduce the ratio of iron/CO entering the torch to favor the continued growth of carbon nanotubes already attached to the ceramic injector. This would allow the production of longer nanotubes at the expense of initiating the growth of new carbon nanotubes. It is unclear whether this two-stage procedure had the desired effect of producing longer nanotubes.

EXAMPLE

This example describes the procedure used for run #6. Except for the particular microwave power and gas flow rates used, and for the reduction in flow rate for run #8, the sequence of steps for run #6 is the same as for the other runs listed in Table I.

A particle bed containing a mixture of iron particles having an average diameter of about 10 microns and glass beads having an average diameter of about 2 millimeters was prepared. The relatively large glass beads were used as a component of the mixture in order to increase the surface contact area between the iron particles and CO, and to provide a lower back pressure than what would be expected for a bed of micron scale iron particles without the much larger glass beads. The mechanical pump was activated and the chimney was connected to the pressure control system, aided by vacuum provided by the pump. About four hundred Watts of tuned microwave power was directed through the waveguide to the microwave cavity of the torch. An argon stream of about 1100 sccm was then directed through inlet tube 18 and into the torch where it was ignited into plasma. A flow of carbon monoxide of about 1120 sccm was directed through inlet 18 and into the torch to produce an argon/CO plasma. The argon flow through inlet 18 was then discontinued. Next, a flow of carbon monoxide of about 22.4 sccm was directed through the iron particle bed and then through inlet 18 and to the torch. Next, argon (550 sccm) was directed through the inner ceramic injector tube 26 and into the torch. After two hours, the argon flow was discontinued. Then, the CO flow was discontinued. After turning off the microwave power, the apparatus was allowed to cool. After cooling, the nanotubes formed on the outer surface of the injector were collected. The system was checked in other places for product. Solids were present on the filter paper of filter 38 that appeared to include iron particles and graphite, but did not include carbon nanotubes.

Figure 3:
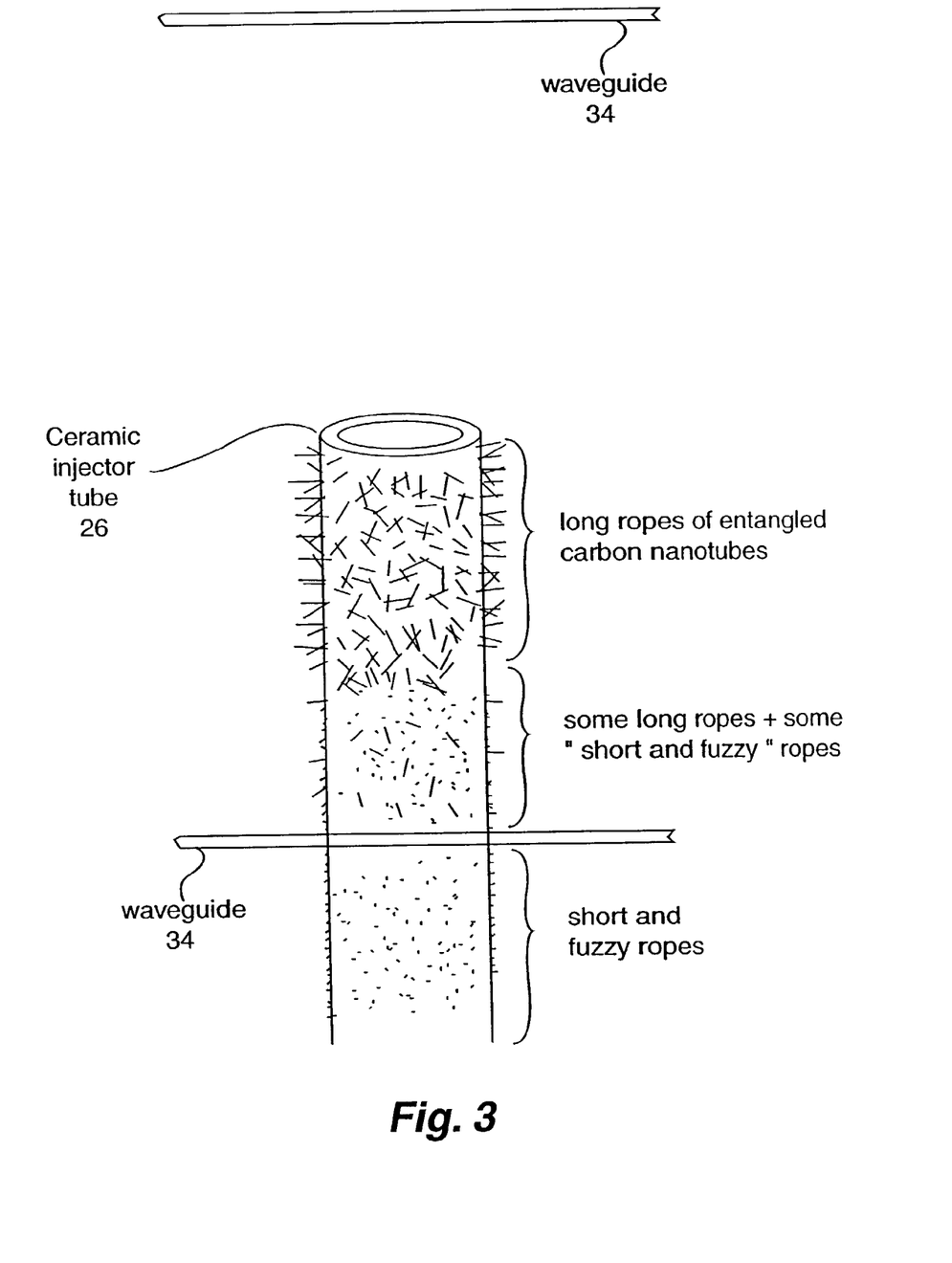
FIG. 3 shows a schematic representation of the ceramic injector tube relative to the waveguide and shows the location and type of carbon products recovered from the surface of the injector tube.

FIG. 3 shows a schematic representation of the ceramic injector tube relative to the waveguide. As shown in FIG. 3, the upper end of the injector tube is approximately at the center of the waveguide. Also shown is the location of the carbon nanotubes recovered from the surface of the injector tube. The entire carbon product recovered from the surface of ceramic tube 26 appeared to be in the form of ropes of entangled nanotubes of varying length and thickness. The longest of these ropes were over 5 millimeters long. Many of the ropes had a diameter wider than 50 microns.

As FIG. 3 shows, the longest ropes were collected on a surface portion of the ceramic injector tube near the center of the microwave cavity, which is believed to be located in the hottest portion (i.e. the hot zone) of the plasma. A smaller fraction of the ropes collected below this portion were long; most were shorter and to the naked eye appeared fuzzy looking. Further down to a still cooler region, only the fuzzy looking product was collected.

Images of the longer ropes were obtained using a JEOL 2010 high-resolution transmission electron microscope with point-to-point resolution of 0.19 nm. These images were used to determine the quality and tube diameter of the nanotubes, and to discriminate between MWNT and SWNT.

Carbon was also found elsewhere in the apparatus, away from the ceramic injector tube. However, exhaustive investigation using TEM revealed that none of the carbon product found away from the ceramic injector tube included nanotubes.

Figure 4A:
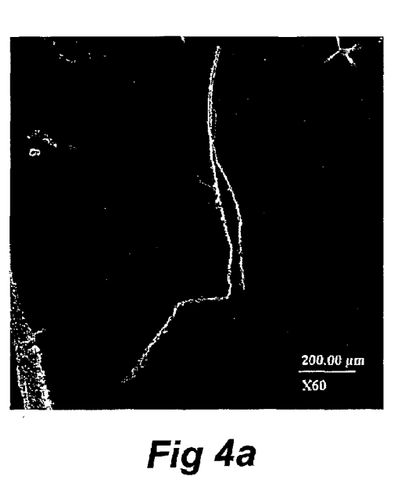
FIGS. 4a–j show photomicrographs of increasing magnification of carbon nanotube bundles produced according to the method of the invention.
Figure 4B:
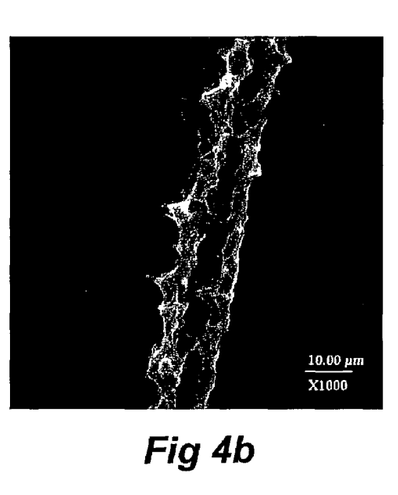
Figure 4C:
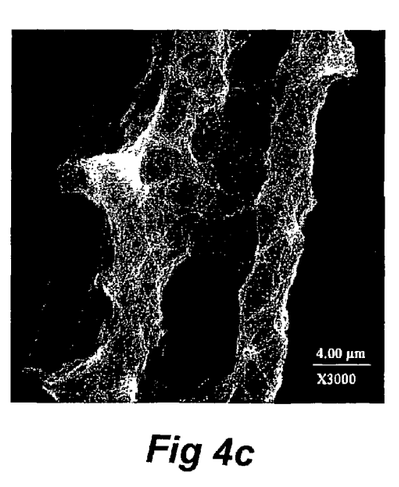
Figure 4D:
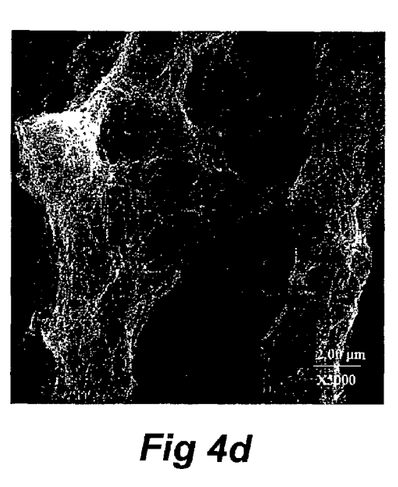
Figure 4E:
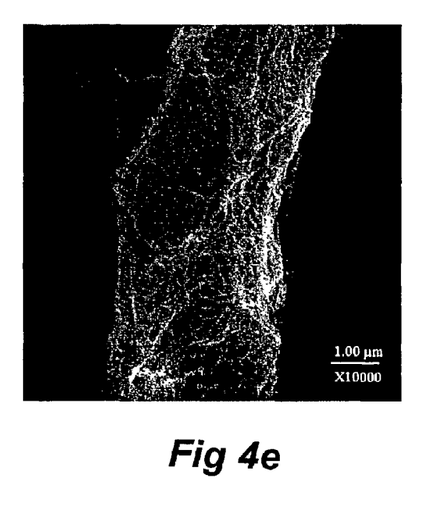
Figure 4F:
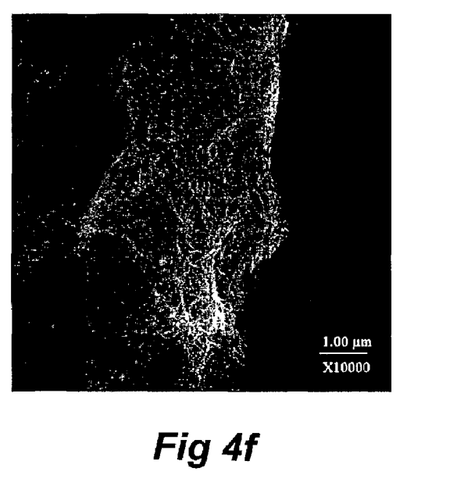
Figure 4G:
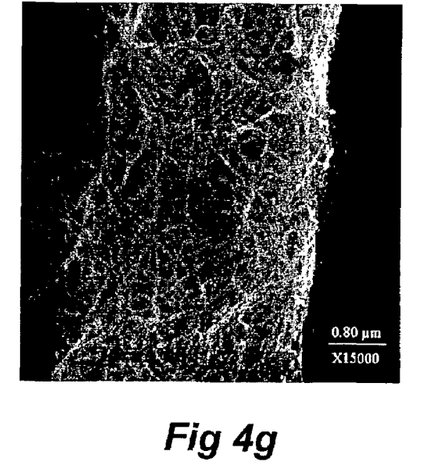
Figure 4H:
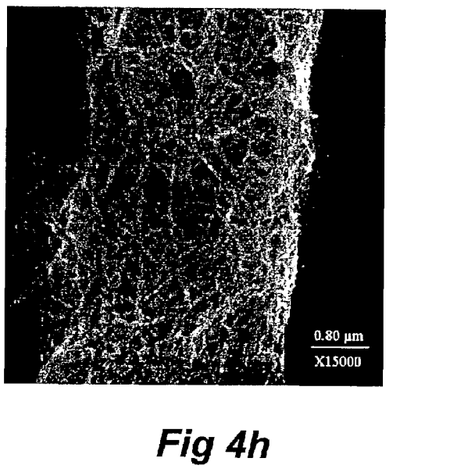
Figure 4I:
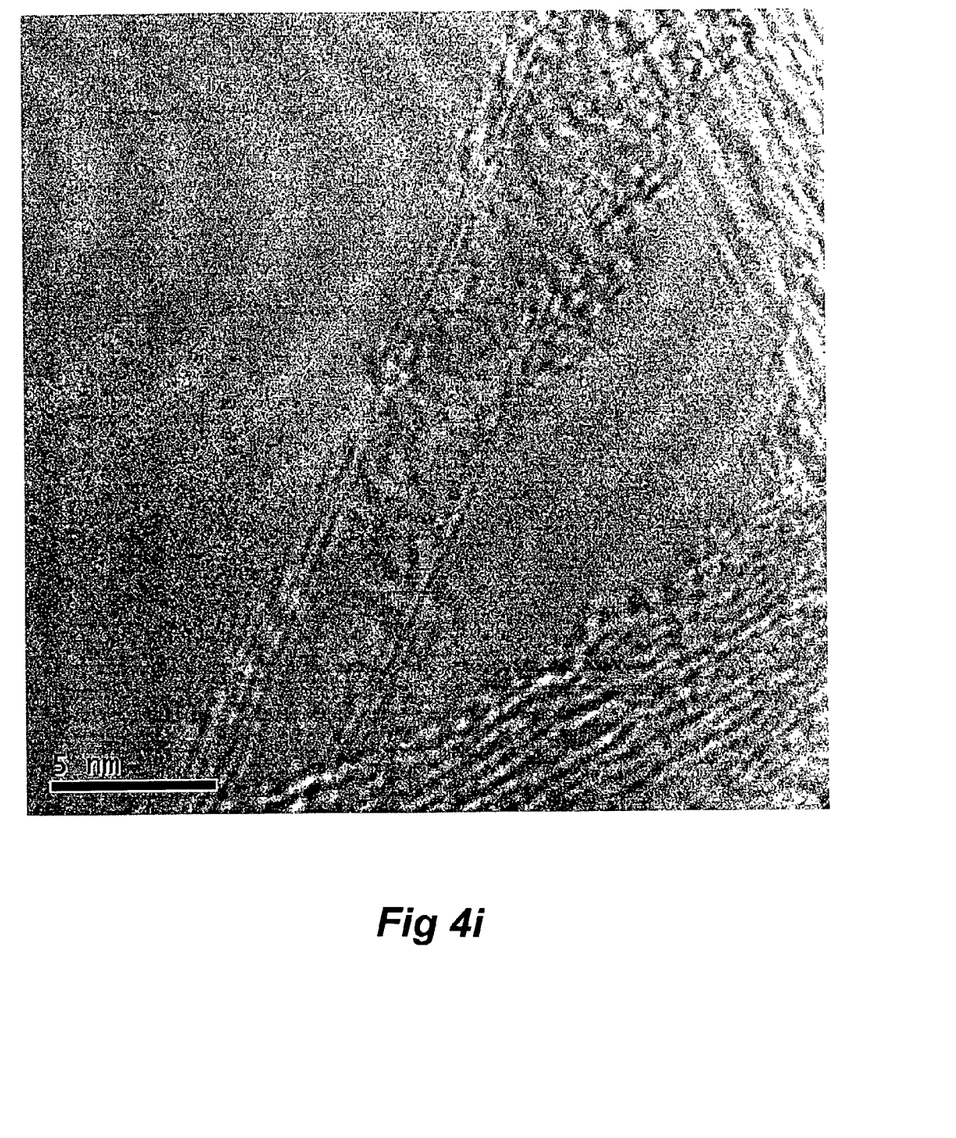
Figure 4J:
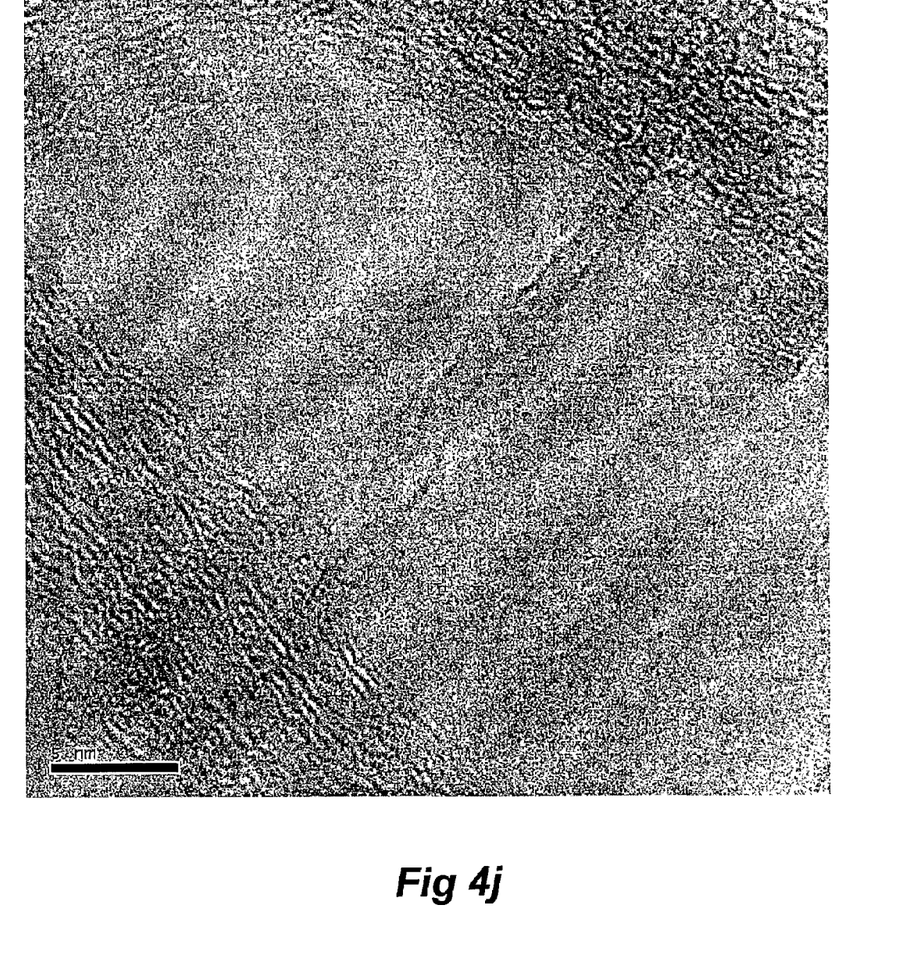

Scanning electron micrographs (SEMs) of two of the ropes collected for run #6 are shown in FIGS. 4a–h, in order of increasing magnification. FIGS. 4i–j show transmission electron micrographs of invidual nanotubes also collected from run #6. FIGS. 4a–d are relatively low magnification SEMs that show the general shape of the ropes. As the magnification increases for FIGS. 4e–h, individual nanotubes become apparent. FIG. 4i is a high magnification transmission electron micrograph (TEM) showing an individual MWNT, in this case a double-walled carbon nanotube. FIG. 4j is a high magnification TEM showing an individual SWNT.

Other TEM images of the MWNT and SWNT produced according to the invention, in general, show a defect population of nanotubes that is typical of tubes produced by other methods. These types of defects have successfully been removed by annealing in an inert gas environment, and it is expected that such a treatment would also remove defects from the defect population of nanotubes produced using the invention. As an aside, the ends of the nanotubes appear to be open, in contrast to end-capped SWNT produced by other methods [see: A. Thess, R. Lee, P. Nikolaev, H. Dai, P. Petit, J. Robert, C. Xu, Y. H. Lee, S. G. Kim, A. G. Rinzler, D. T. Colbert, G. E. Scuseria, D. Tomanek, J. E. Fischer, and R. E. Smalley, "Crystalline Ropes of Metallic Carbon Nanotubes," Science, vol. 273, pp. 483–487 (1996)].

The foregoing description of the invention has been presented for purposes of illustration and description and is not intended to be exhaustive or to limit the invention to the precise form disclosed, and obviously many modifications and variations are possible in light of the above teaching.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing carbon nanotubes, comprising the steps of:
   (a) generating an atmospheric pressure microwave plasma comprising argon;
   (b) directing a flow of carbon monoxide through metal particles and then across a solid surface located in the microwave plasma, whereby carbon nanotubes attached to the surface are produced.

2. The method of claim 1, wherein the metal particles comprise at least one metal selected from the group consisting of chromium, molybdenum, tungsten, manganese, rhenium, iron, ruthenium, osmium, cobalt rhodium, iridium, nickel, palladium, and platinum.

3. The method of claim 2, wherein the metal particles comprise iron.

4. The method of claim 1, wherein the carbon nanotubes comprise single-walled carbon nanotubes.

5. The method of claim 1, wherein the carbon nanotubes comprise multi-walled carbon nanotubes.

6. A method of producing carbon nanotubes, comprising the steps of:
   (a) generating a carbon monoxide plasma comprising a plasma hot zone;
   (b) directing a flow of gas through a ceramic tube, the tube comprising a surface portion located in the plasma, the gas selected from the group consisting of argon, helium, xenon, krypton, neon, oxygen, nitrogen, and mixtures thereof; and
   (c) directing a flow of carbon monoxide through metal particles and then across the surface portion of the ceramic tube located in the plasma, whereby carbon nanotubes are produced that are attached to the surface portion located in the plasma.

7. The method of claim 6, wherein the surface portion of the ceramic tube is located in the plasma hot zone.

8. The method of claim 6, wherein the flow of gas directed through the ceramic tube comprises argon.

9. The method of claim 6, wherein said argon plasma comprises an atmospheric plasma.

10. The method of claim 6, wherein the metal particles comprise at least one metal selected from the group consisting of chromium, molybdenum, tungsten, manganese, rhenium, iron, ruthenium, osmium, cobalt rhodium, iridium, nickel, palladium, and platinum.

11. The method of claim 10, wherein the metal particles comprise iron.

12. The method of claim 6, wherein the carbon nanotubes comprise single-walled carbon nanotubes.

13. The method of claim 6, wherein the carbon nanotubes comprise multi-walled carbon nanotubes.

* * * * *